Dec. 31, 1946.  K. B. KAISER  2,413,452
CUTTER
Filed Jan. 26, 1944  2 Sheets-Sheet 1

INVENTOR
Karl B. Kaiser
By Carlson, Pitzner, Hubbard Wolfe
ATTORNEYS

Dec. 31, 1946.   K. B. KAISER   2,413,452
CUTTER
Filed Jan. 26, 1944   2 Sheets-Sheet 2
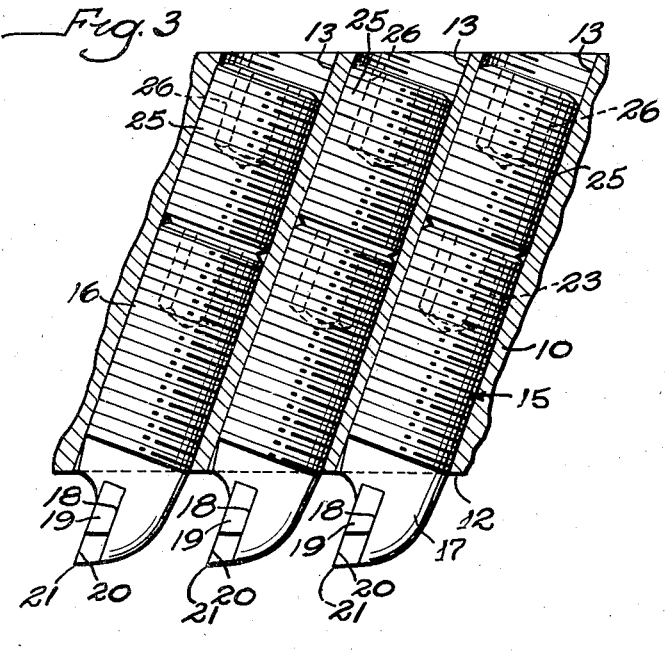
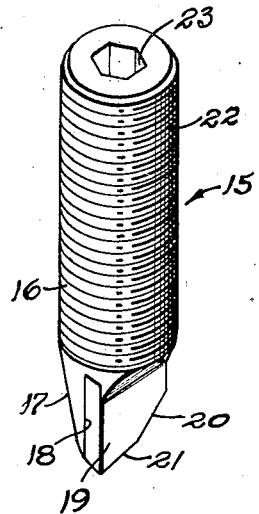
INVENTOR
Karl B. Kaiser
ATTORNEYS Patented Dec. 31, 1946

2,413,452

UNITED STATES PATENT OFFICE 2,413,452

CUTTER

Karl B. Kaiser, Rockford, Ill., assignor to The Ingersoll Milling Machine Company, Rockford, Ill., a corporation of Illinois Application January 26, 1944, Serial No. 519,731

1 Claim. (Cl. 29—105)

The invention relates to inserted blade cutters such as are used for milling, boring, etc.

One object is to provide a cutter of the above general character having the blades mounted in a novel manner which permits of a substantial increase in the number of effective cutting edges in a cutter of a given size, thus enabling the cutter to be operated at a very high feed rate.

Another object is to provide an improved blade mounting for rotary cutters which enables the blades to be mounted close together without objectionably weakening the cutter body, and which facilitates setting of the blades at any desired cutting angle.

Still another object is to provide an improved blade mounting which is simple and inexpensive to manufacture and which permits convenient adjustment or replacement of the blades.

A further object is to provide a blade mounting which enables the shank of the blade and the cooperating elements of the cutter body to be formed by simple inexpensive machining operations such as turning, drilling, and tapping.

It is also an object of the invention to provide a novel means for locking the blades rigidly in any adjusted position.

Other objects and advantages of the invention will become apparent from the following detailed description of the preferred embodiment illustrated in the accompanying drawings in which:

Fig. 3 is a fragmentary vertical sectional view taken on the line 3—3 of Fig. 1.

Fig. 4 is a perspective view of the improved cutter blade.

Figure 1:
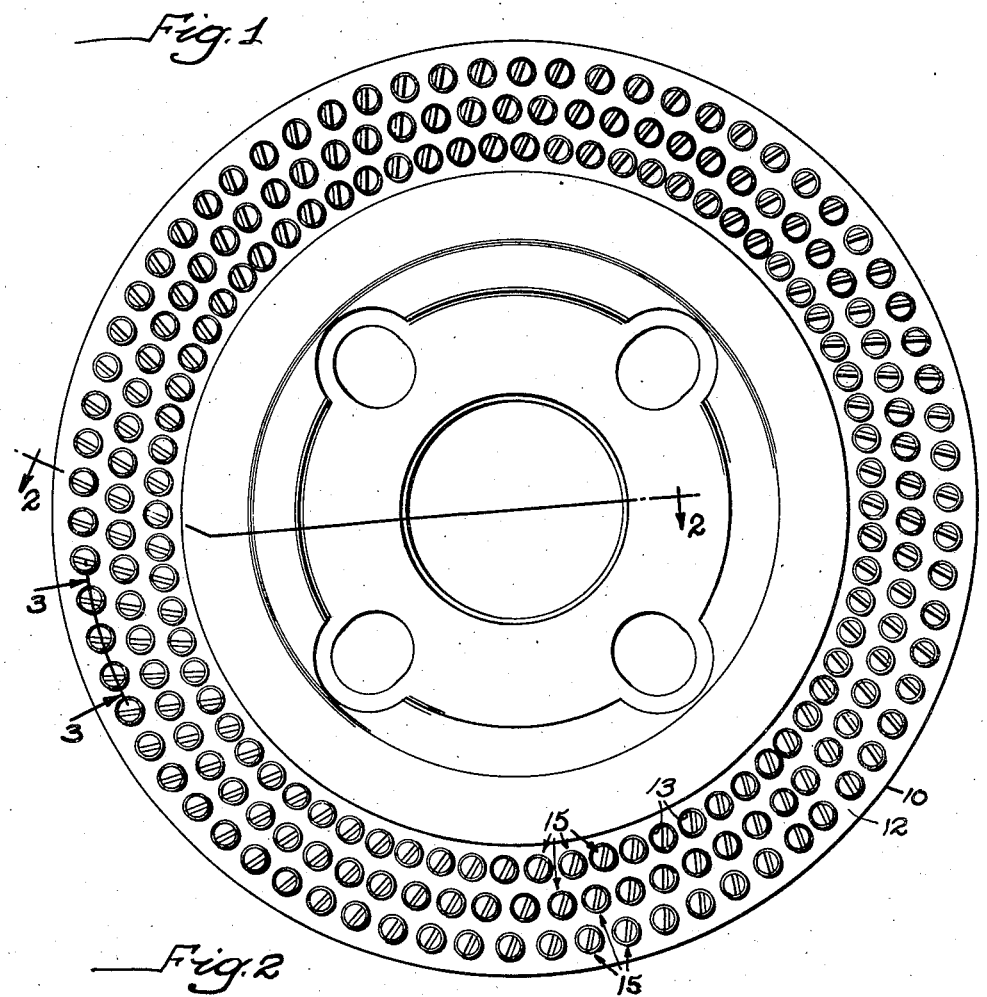
Figure 1 is a plan view of a face milling cutter embodying the features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

Figure 2:
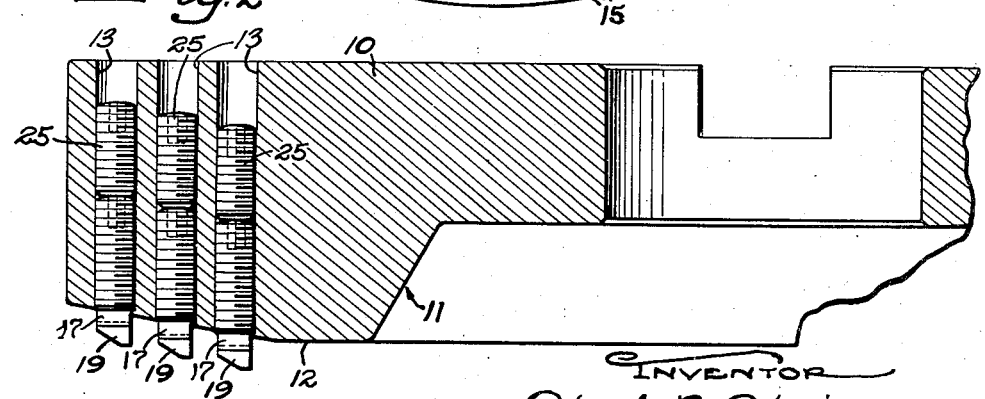
Fig. 2 is a sectional view of the cutter taken in a vertical plane substantially on the line 2—2 of Fig. 1.

Referring now to Figs. 1 and 2 of the drawings, I have shown a face milling cutter having a cylindrical body or blade holder 10 adapted to be mounted in the usual way on the spindle of a milling machine for rotation about a centrally located axis. The outer side of the body 10 is centrally recessed as at 11 leaving an annular end face 12. A plurality of blade receiving holes 13 extend generally longitudinally of the cutter axis and open at the face 12. These holes receive blades 15 whose ends 17 project beyond the face 12 and are thus offset eccentrically with respect to the cutter axis and are accordingly carried through a circular path of substantial diameter by the rotation of the body. Preferably, the holes 13 diverge outwardly in the direction of the end face 12 to enable the desired cutting angles to be attained. In the particular cutter illustrated, the face 12 is coned somewhat to enable the blades 15 to be arranged in a plurality of rows and to facilitate chip disposal.

In accordance with the present invention, the cutter blades 15 are constructed so that they require a minimum of mounting space in the cutter body 10, thus permitting a substantial increase in the number of effective cutting edges in a cutter of a given size without objectionably weakening the cutter body. To this end, each blade is constructed in the form of a cylindrical block of steel or other suitable material including a shank portion 16 (Figs. 2 and 4) and a cutting portion or tooth 17. The cutting portion 17 may be ground to provide a cutting edge, if desired, or it may be recessed as at 18 for the attachment of a tip 19 of hard cutting material, as, for example, tungsten carbide. The tip 19, as shown, is ground to provide a beveled cutting edge 20 inclined at a desired angle to the plane of rotation of the cutter and a finishing edge 21 lying substantially in this plane.

For mounting the blade 15 in the cutter body, the shank 16 is formed with external screw threads 22, and each of the holes 13 in the cutter body is correspondingly internally threaded. The threads are preferably of relatively fine pitch so as to hold the blade firmly against axial displacement and permit endwise adjustment of the cutting edges in small increments preparatory to resharpening. Such adjustment for wear may be effected simply by screwing the blade out of its hole 13.

As herein shown, the holes 13 extend entirely through the cutter body 10 opening both at the front and rear faces thereof, thus providing access to the rear end of the blade shank for adjusting purposes. The end of the shank is accordingly shaped for the engagement of a wrench or the like by which it may be turned, the exemplary blade having a hexagonal socket 23 for that purpose.

Means is provided for rigidly locking the blades 15 in adjusted positions. Preferably, this means utilizes the threads formed in the holes 13 thus avoiding further weakening of the cutter body. As shown in Figs. 2 and 3, the locking means comprises externally threaded plugs 25 adapted to be screwed into the holes 13 and tightened against the rear ends of the blade shanks 16 to form a rigid backing for the blades and also lock them against turning. These screws are provided with tool engaging sockets 26 similar to the sockets 23.

Due to their simple cylindrical form, the blade receiving holes 13 and blade shanks 16 may be produced by rapid, inexpensive machining operations. Thus, the blade shanks 16 may be formed by turning and threading operations while the holes 13 require only drilling and tapping operations. Manufacturing costs are thus relatively low.

Due to the cylindrical form of the blade shanks 16 and to the absence of keys, wedges, and similar conventional locking means, a minimum of space is required for mounting the blades in the cutter body. The holes 13 for receiving the blade shanks may, therefore, be placed relatively close together in the same annular row and in adjacent rows without objectionably weakening the cutter body. Accordingly, a much larger number of the blades may be mounted in an annular row in a body of given diameter than is possible when the blades are mounted in the conventional manner. Accordingly, the permissible rate of feed of the face milling cutter is increased proportionately. Also, since the blade shanks and the locking screws fill the holes 13, the body with the blades mounted therein is a solid structure thereby providing extreme rigidity of blade mounting in spite of the close spacing of the blade recesses.

In the exemplary cutter, the blades 15 are mounted in three circular rows concentric with its rotational axis. Preferably, the holes 13 for the respective rows of blades are staggered or offset circumferentially with respect to the holes of the adjacent rows to permit close spacing of the rows thereby enabling substantially the same number of blades to be included in the different rows. With the improved blade mounting utilizing holes of five sixteenth inch diameter, as many as seventy blades can be accommodated in each of the rows with a cutter body of approximately eleven inches in diameter. Thus, a plurality of rows of blades may be used without detracting appreciably from the permissible rate at which the cutter may be fed along the work. Such a cutter is particularly adapted for removing a thick layer of stock, part of which is cut by the blades in the successive rows progressing inwardly.

It will be apparent that the improved blade mounting is particularly suited for milling cutters of the face milling type. The cylindrical shaped threaded shanks of the blades, and the correspondingly shaped threaded holes of the body may be produced by simple machining operations and at relatively low cost. Moreover, the blades require a minimum of mounting space in the cutter body and may be arranged in closely spaced relation and in large numbers without unduly weakening the cutter body.

The improved blade mounting is also advantageous in providing for adjustment of the blade axially for wear adjustment and angularly to provide different desired rake angles, so that one cutter may be adapted for operation on work material having widely varying characteristics. Furthermore, the blades may be locked rigidly in adjusted positions by means of simple, inexpensive screw plugs which utilize the threads cut for the blades. In general, the improved blade mounting materially simplifies initial assembly of the cutter, facilitates wear adjustment and replacement of the blades, and provides a cutter well adapted for heavy duty service and capable of being operated at very high feed rates.

I claim as my invention:

A cutter comprising a body having a cylindrical hole extending therethrough and open at both ends, internal threads of uniform diameter formed in the wall of said hole throughout the length thereof, a blade having a cutting edge carried by and rigid with one end thereof, external threads formed on the shank of said blade and screwed into said hole to project said cutting edge beyond one end of the hole, the other end portion of said hole being sized and the other end of said blade being recessed to receive a tool for turning said blade in said hole and thereby adjusting said cutting edge axially of the hole, and a screw threaded into said other end portion of the hole and tightened against the end of said shank to force the latter against the threads of said hole and thereby lock the shank against turning in the hole.

KARL B. KAISER.